United States Patent
Wang et al.

(10) Patent No.: US 11,221,681 B2
(45) Date of Patent: Jan. 11, 2022

(54) METHODS AND APPARATUSES FOR RECOGNIZING DYNAMIC GESTURE, AND CONTROL METHODS AND APPARATUSES USING GESTURE INTERACTION

(71) Applicants: BEIJING SENSETIME TECHNOLOGY DEVELOPMENT CO., LTD, Beijing (CN); SHANGHAI SENSETIME INTELLIGENT TECHNOLOGY CO., LTD., Shanghai (CN)

(72) Inventors: Quan Wang, Beijing (CN); Chen Qian, Beijing (CN)

(73) Assignees: BEIJING SENSETIME TECHNOLOGY DEVELOPMENT CO., LTD, Beijing (CN); SHANGHAI SENSETIME INTELLIGENT TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/530,190

(22) Filed: Aug. 2, 2019

(65) Prior Publication Data

US 2019/0354194 A1 Nov. 21, 2019

Related U.S. Application Data

(63) Continuation of application No. PCT/CN2018/122767, filed on Dec. 21, 2018.

(51) Int. Cl.
*G06F 3/01* (2006.01)
*G06K 9/00* (2006.01)

(52) U.S. Cl.
CPC .......... *G06F 3/017* (2013.01); *G06K 9/00355* (2013.01)

(58) Field of Classification Search
CPC .......... G06F 3/01; G06F 6/017; G06F 6/0482; G06F 6/04842; G06F 6/04847;
(Continued)

(56) References Cited

U.S. PATENT DOCUMENTS 6,075,895 A * 6/2000 Qiao .................. A63F 13/06
382/218
9,268,408 B2 * 2/2016 Chou .................. G06F 3/0304
(Continued)

FOREIGN PATENT DOCUMENTS

CN 102053702 A 5/2011
CN 102222431 A 10/2011
(Continued)

OTHER PUBLICATIONS

First Office Action of the Chinese application No. 201810974244.8, dated Dec. 2, 2019.
(Continued)

*Primary Examiner* — Dong Hui Liang
(74) *Attorney, Agent, or Firm* — Syncoda LLC; Feng Ma

(57) ABSTRACT

A method for recognizing a dynamic gesture includes: positioning a dynamic gesture in a video stream to be detected to obtain a dynamic gesture box; capturing an image block corresponding to the dynamic gesture box from each of multiple image frames of the video stream; generating a detection sequence based on the captured image block; and performing dynamic gesture recognition according to the detection sequence.

18 Claims, 10 Drawing Sheets

(58) Field of Classification Search
CPC .. G06K 9/00; G06K 9/00335; G06K 9/00771; G06K 9/4628; G06K 9/6274; G06K 9/00255; G06K 9/00268; G06K 9/00355; G06K 9/00369; G06K 9/00375; G06K 9/209; G06K 9/6268

See application file for complete search history.

(56) References Cited

U.S. PATENT DOCUMENTS

| | | | | |
|---|---|---|---|---|
| 9,355,236 | B1* | 5/2016 | Kratz | G06F 21/32 |
| RE46,310 | E* | 2/2017 | Hoffberg | G06F 3/017 |
| 10,296,102 | B1* | 5/2019 | Misra | G06K 9/2054 |
| 2002/0057383 | A1* | 5/2002 | Iwamura | G06F 3/005 |
| | | | | 348/734 |
| 2003/0113018 | A1* | 6/2003 | Nefian | G06K 9/00335 |
| | | | | 382/181 |
| 2004/0227817 | A1* | 11/2004 | Oya | H04N 7/181 |
| | | | | 348/155 |
| 2005/0105759 | A1* | 5/2005 | Roberts | G06K 9/00335 |
| | | | | 382/100 |
| 2005/0271279 | A1* | 12/2005 | Fujimura | G06K 9/00389 |
| | | | | 382/203 |
| 2008/0065291 | A1* | 3/2008 | Breed | G06K 9/00355 |
| | | | | 701/36 |
| 2011/0013807 | A1* | 1/2011 | Lee | G06K 9/00355 |
| | | | | 382/107 |
| 2011/0243380 | A1* | 10/2011 | Forutanpour | G06F 3/017 |
| | | | | 382/103 |
| 2011/0304541 | A1* | 12/2011 | Dalal | G06F 3/017 |
| | | | | 345/158 |
| 2012/0268374 | A1* | 10/2012 | Heald | G06F 3/005 |
| | | | | 345/158 |
| 2013/0004016 | A1* | 1/2013 | Karakotsios | G06K 9/00288 |
| | | | | 382/103 |
| 2013/0058565 | A1 | 3/2013 | Rafii et al. | |
| 2013/0188836 | A1* | 7/2013 | Fang | G06K 9/00335 |
| | | | | 382/103 |
| 2013/0249786 | A1* | 9/2013 | Wang | G06K 9/00389 |
| | | | | 345/156 |
| 2013/0342636 | A1* | 12/2013 | Tian | G06T 7/269 |
| | | | | 348/14.08 |
| 2013/0342671 | A1* | 12/2013 | Hummel | G06F 3/011 |
| | | | | 348/77 |
| 2013/0343610 | A1* | 12/2013 | Dal Mutto | G06K 9/00355 |
| | | | | 382/103 |
| 2014/0105453 | A1* | 4/2014 | Yang | G06K 9/00355 |
| | | | | 382/103 |
| 2014/0157209 | A1* | 6/2014 | Dalal | G06K 9/00355 |
| | | | | 715/863 |
| 2014/0337807 | A1* | 11/2014 | Shigeta | G06F 3/017 |
| | | | | 715/863 |
| 2016/0148079 | A1* | 5/2016 | Shen | G06N 3/0454 |
| | | | | 382/157 |
| 2016/0162148 | A1 | 6/2016 | Murphy et al. | |
| 2017/0142336 | A1 | 5/2017 | Muto | |
| 2017/0161607 | A1* | 6/2017 | English | G06F 3/012 |
| 2017/0168586 | A1* | 6/2017 | Sinha | G06N 20/00 |
| 2018/0024641 | A1* | 1/2018 | Mao | G06K 9/00389 |
| | | | | 382/103 |
| 2018/0088671 | A1* | 3/2018 | Wang | G06F 3/0304 |
| 2018/0121717 | A9 | 5/2018 | Rafii et al. | |
| 2019/0325273 | A1* | 10/2019 | Kumar | G06K 9/00315 |

FOREIGN PATENT DOCUMENTS

| | | |
|---|---|---|
| CN | 102402680 A | 4/2012 |
| CN | 102426480 A | 4/2012 |
| CN | 103593680 A | 2/2014 |
| CN | 104834894 A | 8/2015 |
| CN | 106648112 A | 5/2017 |
| CN | 106934333 A | 7/2017 |
| CN | 107169411 A | 9/2017 |
| CN | 107180224 A | 9/2017 |
| CN | 107316022 A | 11/2017 |
| CN | 108197596 A | 6/2018 |
| JP | 2001016606 A | 1/2001 |
| JP | 2010271944 A | 12/2010 |
| JP | 2013257762 A | 12/2013 |
| JP | 2015195020 A | 11/2015 |
| JP | 2017191496 A | 10/2017 |
| WO | 2013137412 A1 | 9/2013 |
| WO | 2015057263 A1 | 4/2015 |

OTHER PUBLICATIONS

Yohei Sato and Kokichi Sugiharat; An approach to real-time gesture recognition for human-PC interaction Guide to the Technical Report and Template; Mathematicai Informatics, Graduate Schoot of Information Scienee and Technology, Feb. 17, 2005, vol. 104, No. 667, pp. 91-96.

First Office Action of the Japanese application No. 2019-543878, dated Mar. 17, 2020.

International Search Report in the international application No. PCT/CN2018/122767, dated Mar. 21, 2019.

First Office Action of the Chinese application No. 201711417801.8, dated Aug. 5, 2020.

* cited by examiner

METHODS AND APPARATUSES FOR RECOGNIZING DYNAMIC GESTURE, AND CONTROL METHODS AND APPARATUSES USING GESTURE INTERACTION

CROSS-REFERENCE TO RELATED APPLICATIONS

The present application is a U.S. continuation application of International Application No. PCT/CN2018/122767 filed on Dec. 21, 2018, which claims priorities to Chinese Patent Application No. 201711417801.8 filed on Dec. 22, 2017 and of Chinese Patent Application No. 201810974244.8 filed on Aug. 24, 2018. The disclosures of these applications are hereby incorporated by reference in their entirety.

BACKGROUND

A gesture is an important human-computer interaction feature in image and video information. The key task of a gesture recognition algorithm is to give an image containing the hand and determine the category of the gesture in the image.

SUMMARY

Embodiments of the present disclosure relate to image processing technologies, and in particular, to methods and apparatuses for recognizing a dynamic gesture, and control methods and apparatuses using gesture interaction.

The embodiments of the present disclosure provide technical solutions of dynamic gesture recognition and technical solutions of gesture interaction control.

According to an aspect of the embodiments of the present disclosure, a method for recognizing a dynamic gesture is provided, including: positioning a dynamic gesture in a video stream to be detected to obtain a dynamic gesture box; capturing an image block corresponding to the dynamic gesture box from each of multiple image frames of the video stream; generating a detection sequence based on the captured image blocks; and performing dynamic gesture recognition according to the detection sequence.

According to another aspect of the embodiments of the present disclosure, a dynamic gesture recognition model establishment method is provided, including: collecting one or more sample video streams involving different categories of dynamic gestures; annotating dynamic gesture boxes of the different categories of dynamic gestures; capturing image blocks corresponding to annotation information of the dynamic gesture boxes from multiple image frames of the sample video stream to form an image sequence; and training a first dynamic gesture recognition model by using categories of the dynamic gestures as supervision data and using the image sequence as training data.

According to still another aspect of the embodiments of the present disclosure, an apparatus for recognizing a dynamic gesture is provided, including: a gesture positioning unit, configured to position a dynamic gesture in a video stream to be detected to obtain a dynamic gesture box; a processing unit, configured to capture an image block corresponding to the dynamic gesture box from multiple image frames of the video stream; a detection sequence generation unit, configured to generate a detection sequence based on the captured image block; and a gesture recognition unit, configured to perform dynamic gesture recognition according to the detection sequence.

According to still another aspect of the embodiments of the present disclosure, an electronic device is provided, including: a memory storing processor-executable instructions; and a processor, configured to execute the stored processor-executable instructions to perform operations of: positioning a dynamic gesture in a video stream to be detected to obtain a dynamic gesture box; capturing an image block corresponding to the dynamic gesture box from each of multiple image frames of the video stream; generating a detection sequence based on the captured image blocks; and performing dynamic gesture recognition according to the detection sequence.

According to still another aspect of the embodiments of the present disclosure, a dynamic gesture recognition model establishment apparatus is provided, including: a first dynamic gesture recognition model establishment unit, where the first dynamic gesture recognition model establishment unit includes: a sample collection subunit, configured to collect one or more sample video streams involving different categories of dynamic gestures; a gesture box annotating subunit, configured to annotate dynamic gesture boxes of the different categories of dynamic gestures; an image sequence forming subunit, configured to capture image blocks corresponding to annotation information of the dynamic gesture boxes from multiple image frames of the sample video stream to form an image sequence; and a training subunit, configured to train a first dynamic gesture recognition model by using the categories of the dynamic gestures as supervision data and using the image sequence as training data.

According to still another aspect of the embodiments of the present disclosure, a control method using gesture interaction is provided, including: obtaining a video stream; determining a dynamic gesture recognition result of the video stream by the method for recognizing a dynamic gesture according to any of the above; and controlling a device to execute an operation corresponding to the dynamic gesture recognition result.

According to still another aspect of the embodiments of the present disclosure, a control apparatus using gesture interaction is provided, including: a video stream obtaining module, configured to obtain a video stream; a result obtaining module, configured to determine a dynamic gesture recognition result of the video stream by the apparatus for recognizing a dynamic gesture according to any of the above; and an operation execution module, configured to control a device to execute an operation corresponding to the dynamic gesture recognition result.

According to still another aspect of the embodiments of the present disclosure, an electronic device is provided, including a processor, where the processor includes the apparatus for recognizing a dynamic gesture according to any of the above, or the dynamic gesture recognition model establishment apparatus according to any of the above, or the control apparatus using gesture interaction according to any of the above.

According to still another aspect of the embodiments of the present disclosure, an electronic device is provided, including: a memory, configured to store executable instructions; and a processor, configured to communicate with the memory to execute the executable instructions to complete operations of the method for recognizing a dynamic gesture according to any of the above, or the dynamic gesture recognition model establishment method according to any of the above, or the control method using gesture interaction according to any of the above.

According to still another aspect of the embodiments of the present disclosure, a non-transitory computer-readable storage medium is provided, having stored thereon computer-readable instructions that, when executed by a processor, cause the processor to perform operations of a method for recognizing a dynamic gesture, the method including: positioning a dynamic gesture in a video stream to be detected to obtain a dynamic gesture box; capturing an image block corresponding to the dynamic gesture box from each of multiple image frames of the video stream; generating a detection sequence based on the captured image blocks; and performing dynamic gesture recognition according to the detection sequence.

According to yet another aspect of the embodiments of the present disclosure, a non-transitory computer program product is provided, including a computer-readable code, where when the computer-readable code is run on a device, a processor in the device executes instructions for implementing the method for recognizing a dynamic gesture according to any of the above, or the dynamic gesture recognition model establishment method according to any of the above, or the control method using gesture interaction according to any of the above.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
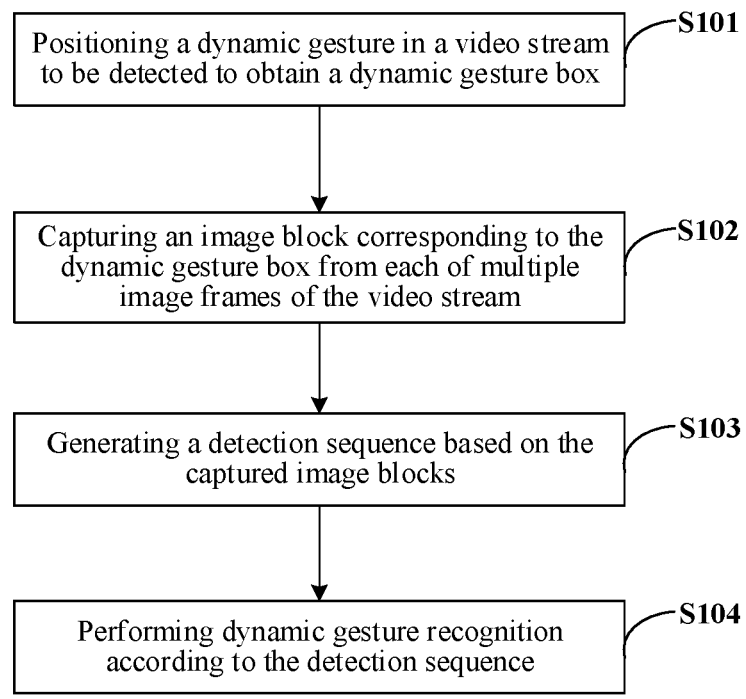
FIG. 1 is a flowchart of a method for recognizing a dynamic gesture according to an embodiment of the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, Personal Computer (PC) systems, server computer systems, thin clients, thick clients, handheld or laptop devices, microprocessor-based systems, set top boxes, programmable consumer electronics, network PCs, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data categories. The computer systems/servers may be practiced in the distributed cloud computing environments in which tasks are performed by remote processing devices that are linked through a communications network. In the distributed computing environments, the program modules may be located in local or remote computing system storage media including storage devices.

In the process of implementing the present disclosure, the inventor finds that the problem in current gesture recognition is that recognition only involves single static images, which means that only some simple static gestures, such as a V-sign, a fist, and an OK gesture, can be recognized. During human-computer interaction, using static gestures to operate a machine is not as natural as dynamic gestures, and static gestures also carry less information. Therefore, a solution for recognizing dynamic gestures is needed.

FIG. 1 is a flowchart of a method for recognizing a dynamic gesture according to an embodiment of the present disclosure. The method may be performed by any electronic device, such as a terminal device, a server, a mobile device, and a vehicle-mounted device. As shown in FIG. 1, the method of this embodiment includes S101-S104.

S101, a dynamic gesture in a video stream to be detected is positioned to obtain a dynamic gesture box.

In an optional example, step S101 may be performed by a processor by invoking a corresponding instruction stored in a memory, and may also be performed by a gesture positioning unit 501 run by the processor.

A dynamic gesture in the embodiments of the present disclosure refers to a gesture composed of a series of actions (which may be continuous or discontinuous actions), and is discussed with respect to a static gesture. For example, the dynamic gesture includes, but is not limited to, a wave, a click, a finger gun gesture, a grabbing gesture, and the like. In an optional application, for example, a wave may implement a page turning operation of a file, a click may implement an operation similar to a mouse click, a finger gun may implement special effect making or connection to games, and grabbing may involve dragging a thing, like dragging a file with a mouse.

The purpose of positioning a dynamic gesture to determine a dynamic gesture box is to subsequently capture an image to be detected in the dynamic gesture box. The dynamic gesture box refers to a box that covers a series of actions in a dynamic gesture, such as a rectangular box, in which the gesture image is included.

It should be understood that since a dynamic gesture includes a series of static gestures, a dynamic gesture box may be determined by first determining a static gesture box and then enlarging the static gesture box, thus ensuring that the dynamic gesture box includes the remaining associated static gestures.

In an optional manner, the dynamic gesture box may be determined as follows: selecting a static gesture in any of image frames of the video stream to be detected, and positioning the static gesture to determine a static gesture box; and enlarging the static gesture box according to a preset enlargement ratio to determine a dynamic gesture box. For example, a static gesture box is selected in a certain image frame of the video stream, the static gesture box is enlarged according to a preset enlargement ratio (for example, 120%), and the enlarged box is a dynamic gesture box. The static gesture box of the multiple image frames may meet the condition: the static gesture box is located within the dynamic gesture box, or the static gesture box is as same as the dynamic gesture box.

S102, an image block corresponding to the dynamic gesture box is captured from each of multiple image frames of the video stream.

The image block captured from the video stream may be continuous frames in the video stream, or may be continuous key frames or sample frames, as long as the image block corresponds to the dynamic gesture box.

In an optional example, step S102 may be performed by a processor by invoking a corresponding instruction stored in a memory, or may be performed by a processing unit 502 run by the processor.

S103, a detection sequence is generated based on the captured image blocks.

The captured image block is typically smaller than the image frames in size and includes the dynamic gesture box in the images. The advantage of such processing is that hand positioning information of the multiple image frames is considered, and in addition, image frames out of the dynamic gesture box are removed and not considered, thereby achieving a noise reduction effect.

In an optional example, step S103 may be performed by a processor by invoking a corresponding instruction stored in a memory, or may be performed by a detection sequence generation unit 503 run by the processor.

S104, dynamic gesture recognition is performed according to the detection sequence.

In an optional example, step S104 may be performed by a processor by invoking a corresponding instruction stored in a memory, or may be performed by a gesture recognition unit 504 run by the processor.

A detection sequence is generated based on the captured image block, and then an image block sequence is captured and generated by the dynamic gesture box (rather than the multiple image frames of the original video stream) for gesture recognition.

Thus, in the embodiments of the present disclosure, an image block corresponding to the dynamic gesture box is captured from the multiple image frames of the video stream, and dynamic gesture recognition is performed according to a detection sequence generated based on the image block. Since dynamic gesture recognition is performed based on the image block corresponding to the dynamic gesture box, a series of varying dynamic gestures can be recognized.

In an optional manner, dynamic gesture recognition is performed based on inter-frame image differences in the detection sequence. Optionally, image differences between multiple image frames in the detection sequence are determined first; then an image difference sequence is generated based on the image differences between the multiple image frames; and finally dynamic gesture recognition is performed according to the detection sequence and the image difference sequence.

Further, in order to ensure the time sequence correlation between the images to be better reflected, it is provided in an optional manner of the embodiments of the present disclosure that gesture recognition is performed based on not only the images but also the image differences. The image difference, which may also be understood as a pixel difference, is obtained by calculating the difference between pixels at the same position in two adjacent image frames. Since the difference between pixels at the same position in two adjacent frames is obtained, the change process and trend of the dynamic gesture may be reflected, and the dynamic change process of the gesture may be better recognized.

Definitely, the image difference between adjacent frames above is only an example. The inter-frame image difference is not limited thereto, and may also be the image difference between non-adjacent frames, for example, the image difference between frames spaced by a fixed number of frames or between random frames. Thus, the inter-frame image difference is the image difference between two adjacent reference frames in the detection sequence. The reference frame is an actual frame or a key frame.

As stated above, the dynamic gesture categories may include, but are not limited to, a wave, a click, a finger gun gesture, a grabbing gesture, and the like. In an optional manner, a first dynamic gesture recognition model and a second dynamic gesture recognition model may be separately established in advance, and the captured images and the calculated image differences are respectively input into the two models, to output the probabilities of at least one dynamic gesture category. A dynamic gesture category with a higher probability (for example, the highest probability) is the result of this recognition.

In an optional manner, recognition may be performed a plurality of times (on a plurality of segments), and the dynamic gesture category is determined based on the plurality of recognition results. For example, after recognition is performed according to one captured image segment (referred to as the first image segment), recognition is performed according to a second image segment, then recognition is performed according to a third image segment, and finally, the dynamic gesture category is determined according to the three recognition results. Therefore, in this implementation, the foregoing method further includes the following steps: capturing a preset number of image frames a plurality of times, calculating image differences a plurality of times, and performing dynamic gesture recognition according to the captured images and the calculated image differences a plurality of times; and determining a final dynamic gesture recognition result according to the probabilities of a dynamic gesture category obtained by the repeated dynamic gesture recognition. For example, in an optional manner, the probabilities of at least one dynamic gesture category obtained by the repeated dynamic gesture recognition are summed up, and a dynamic gesture category having a high total probability (including the highest probability, or a certain probability in the first n probabilities in the probabilities sorted in descending order, where n is an integer greater than 1) is determined as the final dynamic gesture recognition result. By performing recognition on the image segments a plurality of times and summing up the probabilities obtained by the repeated recognition to determine a final recognition result, the amount of calculation per time may be reduced, and the real-time recognition speed may be improved, especially suitable for a dynamic gesture with a large action time span.

Figure 2:
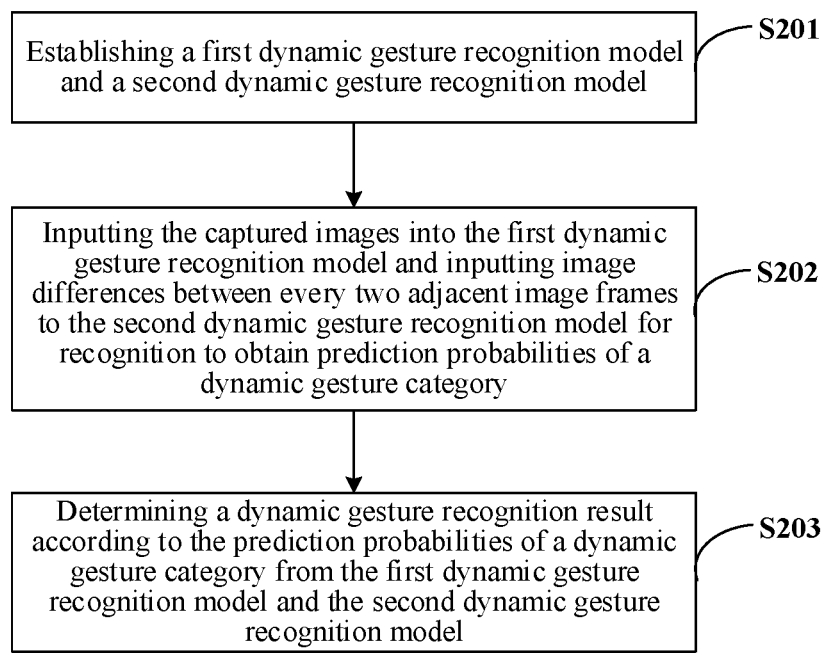
FIG. 2 is another flowchart of a method for recognizing a dynamic gesture according to an embodiment of the present disclosure.

FIG. 2 is another flowchart of a method for recognizing a dynamic gesture according to an embodiment of the present disclosure. On the basis of the embodiment of FIG. 1, the embodiment of FIG. 2 illustrates a process of detecting a dynamic gesture in a video stream to be detected by using convolutional neural networks as dynamic gesture recognition models.

As shown in FIG. 2, the method of this embodiment includes S201-S204.

S201, a first dynamic gesture recognition model and a second dynamic gesture recognition model are established.

Figure 3:
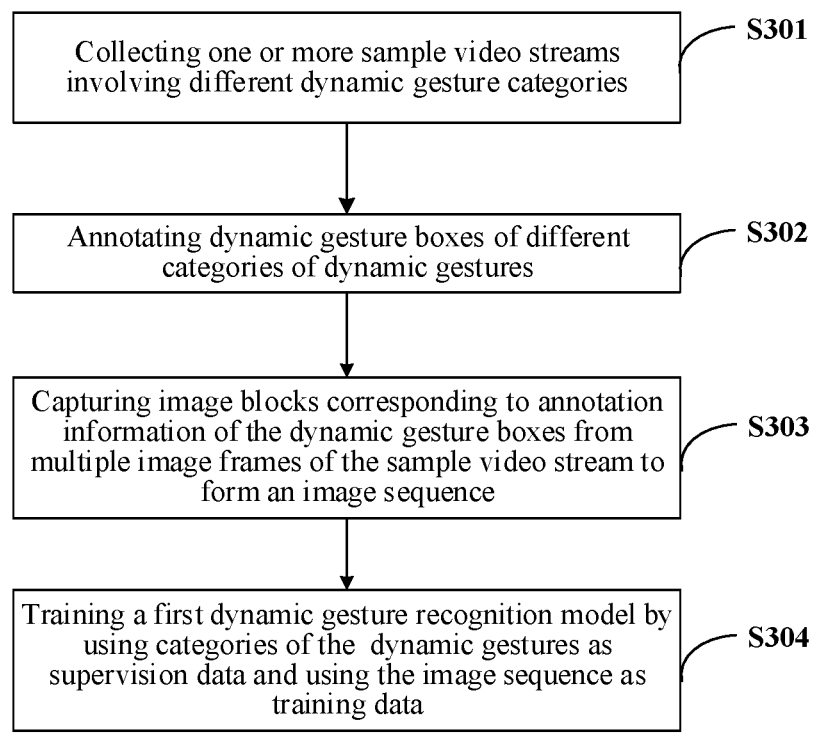
FIG. 3 is a flowchart of establishing a first dynamic gesture recognition model according to an embodiment of the present disclosure.
Figure 4:
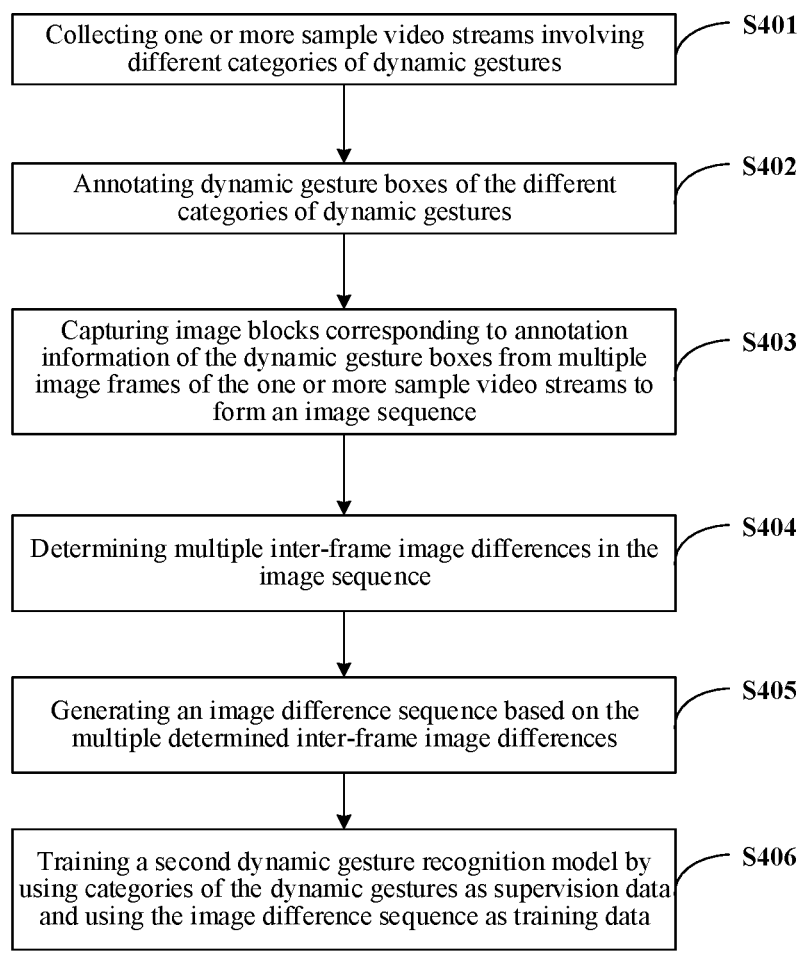
FIG. 4 is a flowchart of establishing a second dynamic gesture recognition model according to an embodiment of the present disclosure.

In an optional manner, reference is made to FIG. 3 and FIG. 4. FIG. 3 is a flowchart of establishing a first dynamic gesture recognition model according to an embodiment of the present disclosure. FIG. 4 is a flowchart of establishing a second dynamic gesture recognition model according to an embodiment of the present disclosure.

Referring to FIG. 3, the process of establishing a first dynamic gesture recognition model includes S301-S304.

S301, one or more sample video streams involving different categories of dynamic gestures are collected.

In an optional example, step S301 may be performed by a processor by invoking a corresponding instruction stored in a memory, or may be performed by a sample collection subunit 6071 run by the processor.

For example, a video stream involving known dynamic gesture categories (such as a wave, a click, a finger gun, and grabbing) is collected, and the start and end frames of the sample video stream are annotated.

S302, dynamic gesture boxes of the different categories of dynamic gestures are annotated.

In an optional example, step S302 may be performed by a processor by invoking a corresponding instruction stored in a memory, or may be performed by a gesture box annotating subunit 6072 run by the processor.

The dynamic gesture box refers to a box that covers a series of actions in a dynamic gesture in the sample video stream, such as a rectangular box, in which each static gesture image of the dynamic gesture is included.

It should be understood that since a dynamic gesture includes a series of static gestures, a dynamic gesture box may be determined by first determining a static gesture box and then enlarging the static gesture box, thus ensuring that the dynamic gesture box includes the remaining associated static gestures.

In an optional manner, the dynamic gesture box may be determined as follows: selecting a static gesture in any image of the sample video stream, and positioning the static gesture to determine a static gesture box; and enlarging the static gesture box according to a preset enlargement ratio to determine a dynamic gesture box. For example, a static gesture box is selected in a certain image frame of the video stream, the static gesture box is enlarged according to a preset enlargement ratio (for example, 120%), and the enlarged box is a dynamic gesture box.

S303, image blocks corresponding to annotation information of the dynamic gesture boxes are captured from multiple image frames of the sample video stream to form an image sequence.

In an optional example, step S303 may be performed by a processor by invoking a corresponding instruction stored in a memory, or may be performed by an image sequence forming subunit 6073 run by the processor.

S304, a first dynamic gesture recognition model is trained by using categories of the dynamic gestures as supervision data and using the image sequence as training data.

In an optional example, step S304 may be performed by a processor by invoking a corresponding instruction stored in a memory, or may be performed by a training subunit 6074 run by the processor.

In an optional manner, a first dynamic gesture recognition model is established by the following steps:

(1) the image sequence is divided into at least one segment. For example, the image sequence is divided into three segments on average.

(2) a preset number of image frames are extracted from the at least one segment, and the image frames are stacked to form image training data.

For example, five image frames are extracted (randomly or continuously) from each image data segment for stacking to form image training data. Or, a total of ten image frames are extracted (randomly or continuously) from at least one image data segment for stacking to form image training data.

Optionally, taking three-dimensional matrix data of a convolutional neural network as an example, the three dimensions are respectively channel, and the height and width of an image. For example, the number of channels of a grayscale image is 1, and the number of channels of an RGB image is 3. The stack here is channel stack. For example, if there are five images each having 1 channel, a three-dimensional matrix obtained after stacking has 5 channels.

(3) a first dynamic gesture recognition model is trained by using categories of the dynamic gestures as supervision data and using the image sequence as training data.

Referring to FIG. 4, the process of establishing a second dynamic gesture recognition model includes S401-S406.

S401, one or more sample video streams involving different categories of dynamic gesture are collected.

In an optional example, step S401 may be performed by a processor by invoking a corresponding instruction stored in a memory, or may be performed by a sample collection subunit 6081 run by the processor.

For example, a video stream involving known dynamic gesture categories (such as a wave, a click, a finger gun, and grabbing) is collected, and the start and end frames of the sample video stream are annotated.

S402, dynamic gesture boxes of the different categories of dynamic gestures are annotated.

In an optional example, step S402 may be performed by a processor by invoking a corresponding instruction stored in a memory, or may be performed by a gesture box annotating subunit 6082 run by the processor.

The dynamic gesture box refers to a box that covers a series of actions in a dynamic gesture in the sample video stream, such as a rectangular box, in which each static gesture image of the dynamic gesture is included.

It should be understood that since a dynamic gesture includes a series of static gestures, a dynamic gesture box may be determined by first determining a static gesture box and then enlarging the static gesture box, thus ensuring that the dynamic gesture box includes the remaining associated static gestures.

In an optional manner, the dynamic gesture box may be determined as follows: selecting a static gesture in any image of the sample video stream, and positioning the static gesture to determine a static gesture box; and enlarging the static gesture box according to a preset enlargement ratio to determine a dynamic gesture box. For example, a static gesture box is selected in a certain image frame of the video stream, the static gesture box is enlarged according to a preset enlargement ratio (for example, 120%), and the enlarged box is a dynamic gesture box.

S403, image blocks corresponding to annotation information of the dynamic gesture boxes are captured from multiple image frames of the one or more sample video streams to form an image sequence.

In an optional example, step S403 may be performed by a processor by invoking a corresponding instruction stored in a memory, or may be performed by an image sequence forming subunit 6083 run by the processor.

S404, multiple inter-frame image differences in the image sequence are determined.

In an optional example, step S404 may be performed by a processor by invoking a corresponding instruction stored in a memory, or may be performed by an image difference determination subunit 6084 run by the processor.

In order to ensure the time sequence correlation between the images to be better reflected, multiple inter-frame image differences needs to be determined. The image difference, which may also be understood as a pixel difference, is obtained by calculating the difference between pixels at the same position in two adjacent image frames. Since the difference between pixels at the same position in two adjacent frames is obtained, the change process and trend of the dynamic gesture may be reflected, and the dynamic change process of the gesture may be better recognized.

Definitely, the image difference between adjacent frames above is only an example. The inter-frame image difference is not limited thereto, and may also be the image difference between non-adjacent frames, for example, the image difference between frames spaced by a fixed number of frames or between random frames. Thus, the inter-frame image difference is the image difference between two adjacent reference frames in the detection sequence. The reference frame is an actual frame or a key frame.

S405, an image difference sequence is generated based on the multiple determined inter-frame image differences.

In an optional example, step S405 may be performed by a processor by invoking a corresponding instruction stored in a memory, or may be performed by an image difference sequence determination subunit 6085 run by the processor.

S406, a second dynamic gesture recognition model is trained by using categories of the dynamic gestures as supervision data and using the image difference sequence as training data.

In an optional example, step S406 may be performed by a processor by invoking a corresponding instruction stored in a memory, or may be performed by a training subunit 6086 run by the processor.

In an optional manner, a first dynamic gesture recognition model is established by the following steps:

(1) the image difference sequence is divided into at least one segment;

(2) a preset number of image frames are extracted from the at least one segment, and the image frames are stacked to form image difference training data; and (3) a second dynamic gesture recognition model is trained by using categories of the dynamic gestures as supervision data and using the image difference training data.

It should be noted that the foregoing first dynamic gesture recognition model and second dynamic gesture recognition model may be implemented based on different networks. For example, the first dynamic gesture recognition model and the second dynamic gesture recognition model may be implemented based on convolutional neural networks. Optionally, the first dynamic gesture recognition model may be, but is not limited to, a first neural network model, and the first neural network model is pre-trained based on the sample video stream. The first neural network model may include, but is not limited to, a convolutional layer, a non-linear layer (Relu), a pooling layer, and/or a classification layer. Similarly, the second dynamic gesture recognition model may be, but is not limited to, a second neural network model, and the second neural network model is pre-trained based on the sample video stream. The second neural network model may include, but is not limited to, a convolutional layer, a non-linear layer (Relu), a pooling layer, and/or a classification layer. Definitely, in addition to the convolutional neural networks, the first dynamic gesture recognition model and the second dynamic gesture recognition model may also be implemented based on recurrent neural networks, reinforcement learning neural networks, or generative adversarial neural networks.

S202, the captured images are input into the first dynamic gesture recognition model and the image differences between every two adjacent image frames are input to the second dynamic gesture recognition model for recognition to obtain prediction probabilities of a dynamic gesture category.

A person skilled in the art understands that the recognition work process of the convolutional neural network may generally include: an image feature extraction phase and a feature classification phase. Taking inputting the images into the first dynamic gesture recognition model as an example, a preset number of image frames (for example, 5 frames) are input into the first dynamic gesture recognition model, features in the images are extracted by using a convolutional layer, an activation layer, and a pooling layer, then the features are classified by a classifier, and finally the prediction probability of a dynamic gesture category is obtained.

S203, a dynamic gesture recognition result is determined according to the prediction probabilities of a dynamic gesture category from the first dynamic gesture recognition model and the second dynamic gesture recognition model.

In an optional manner, weighted average processing may be performed on the prediction probabilities of at least one dynamic gesture category from the first dynamic gesture recognition model and the second dynamic gesture recognition model, and a dynamic gesture category with a high weighted average probability (such as the highest weighted average probability) is determined as the result of this dynamic gesture recognition. For example, weight coefficients of the two models may be set in advance, when determining the dynamic gesture recognition result, weighted average processing is performed on the probabilities from the two models according to the weight coefficients of each model, and the dynamic gesture category with the highest weighted average probability is determined as the result of this dynamic gesture recognition. Definitely, in addition to the weighted average method, other methods (such as a harmonic mean method and a quadratic mean method) may also be used for processing the prediction probabilities to finally determine the recognition result.

By the methods for recognizing a dynamic gesture according to the embodiments of the present disclosure, probability recognition is performed on the images and the image differences to obtain the probabilities of at least one dynamic gesture category, and a dynamic gesture category with a high probability (such as the highest probability) is determined as the recognition result, where the image differences may better reflect the time sequence correlation between the images, and thus, dynamic gesture recognition may be implemented.

In an optional manner, by performing recognition on the image segments a plurality of times and summing up the probabilities obtained by the repeated recognition to determine a final recognition result, the amount of calculation per time may be reduced, and the real-time recognition speed may be improved, especially suitable for a dynamic gesture with a large action time span.

A person of ordinary skill in the art may understand that all or some steps for implementing the foregoing method embodiments are achieved by a program by instructing related hardware; the foregoing program can be stored in a computer-readable storage medium; when the program is executed, steps including the foregoing method embodiments are executed. Moreover, the foregoing storage medium includes various media capable of storing program codes, such as Read-Only Memory (ROM), Random Access Memory (RAM), a magnetic disk, or an optical disk.

Figure 5:
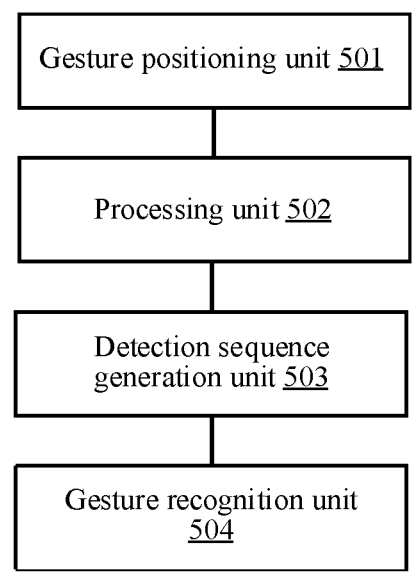
FIG. 5 is a schematic structural diagram of an apparatus for recognizing a dynamic gesture according to an embodiment of the present disclosure.

FIG. 5 is a schematic structural diagram of an apparatus for recognizing a dynamic gesture according to an embodiment of the present disclosure. The apparatus of this embodiment is used for implementing the foregoing method embodiments of the present disclosure. As shown in FIG. 5, the apparatus of this embodiment includes:

a gesture positioning unit 501, configured to position a dynamic gesture in a video stream to be detected to obtain a dynamic gesture box;

a processing unit 502, configured to capture an image block corresponding to the dynamic gesture box from multiple image frames of the video stream;

a detection sequence generation unit 503, configured to generate a detection sequence based on the captured image block; and a gesture recognition unit 504, configured to perform dynamic gesture recognition according to the detection sequence.

Figure 6:
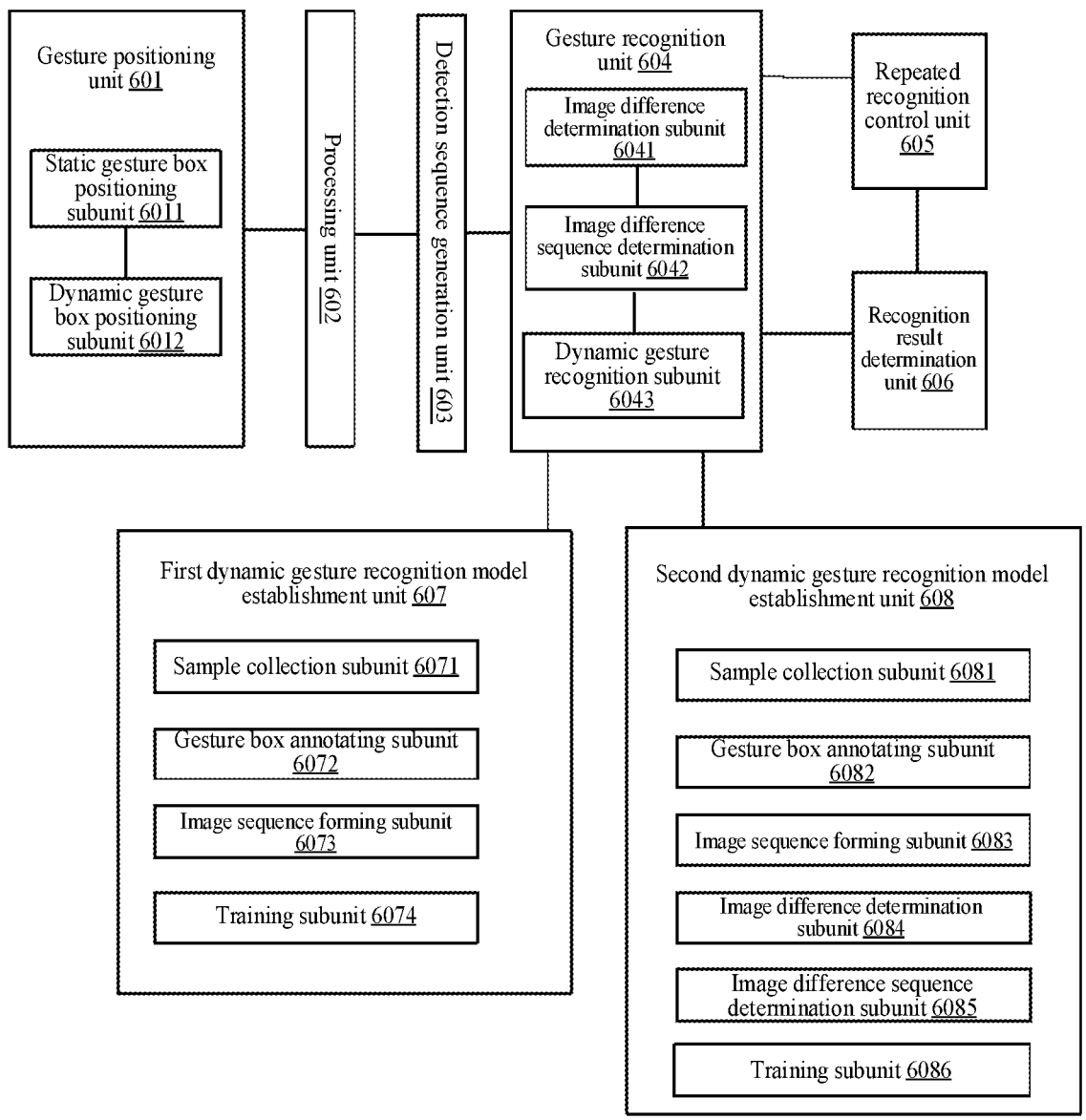
FIG. 6 is another schematic structural diagram of an apparatus for recognizing a dynamic gesture according to an embodiment of the present disclosure.

FIG. 6 is another schematic structural diagram of an apparatus for recognizing a dynamic gesture according to an embodiment of the present disclosure. The apparatus of this embodiment is used for implementing the foregoing method embodiments of the present disclosure. As shown in FIG. 6, the apparatus of this embodiment includes:

a gesture positioning unit 601, configured to position a dynamic gesture in a video stream to be detected to obtain a dynamic gesture box;

a processing unit 602, configured to capture an image block corresponding to the dynamic gesture box from multiple image frames of the video stream;

a detection sequence generation unit 603, configured to generate a detection sequence based on the captured image block; and a gesture recognition unit 604, configured to perform dynamic gesture recognition according to the detection sequence.

In an optional manner, the gesture positioning unit 601 includes:

a static gesture box positioning subunit 6011, configured to position a static gesture in at least one image frame of the multiple image frames of the video stream to obtain a static gesture box of the at least one image frame; and a dynamic gesture box determination subunit 6012, configured to determine the dynamic gesture box according to the static gesture box of the at least one image frame.

In an optional manner, the dynamic gesture box determination subunit 6012 is configured to: enlarge the static gesture box of the at least one image frame to obtain the dynamic gesture box.

In an optional manner, the static gesture box of the at least one image frame of the multiple image frames of the video stream meets the following condition: the static gesture box is located within the dynamic gesture box, or the static gesture box is as same as the dynamic gesture box.

In an optional manner, the gesture recognition unit 604 includes:

an image difference determination subunit 6041, configured to determine multiple inter-frame image differences in the detection sequence;

an image difference sequence determination subunit 6042, configured to generate an image difference sequence based on the multiple determined inter-frame image differences; and a dynamic gesture recognition subunit 6043, configured to perform dynamic gesture recognition according to the detection sequence and the image difference sequence.

In an optional manner, the inter-frame image difference is the image difference between two adjacent reference frames in the detection sequence.

In an optional manner, the dynamic gesture recognition subunit 6043 is configured to: input the detection sequence into a first dynamic gesture recognition model to obtain a first dynamic gesture category prediction probability output by the first dynamic gesture recognition model; input the image difference sequence into a second dynamic gesture recognition model to obtain a second dynamic gesture category prediction probability output by the second dynamic gesture recognition model; and determine a dynamic gesture recognition result according to the first dynamic gesture category prediction probability and the second dynamic gesture category prediction probability.

In an optional manner, the first dynamic gesture recognition model is a first neural network, the second dynamic gesture recognition model is a second neural network, and the first neural network and the second neural network have the same structure or different structures.

In an optional manner, the gesture recognition unit 604 further includes:

a repeated recognition control unit 605, configured to perform the capturing a plurality of times to obtain the detection sequence, generate the image difference sequence a plurality of times, and perform the dynamic gesture recognition a plurality of times according to the detection sequence and the image difference sequence; and a recognition result determination unit 606, configured to determine the dynamic gesture recognition result according to a probability of a dynamic gesture category, the probability being obtained by dynamic gesture recognition each time.

In an optional manner, the gesture recognition unit 604 further includes: a first dynamic gesture recognition model establishment unit 607, where the first dynamic gesture recognition model establishment unit 607 includes:

a sample collection subunit 6071, configured to collect a sample video stream involving different categories of dynamic gestures;

a gesture box annotating subunit 6072, configured to annotate dynamic gesture boxes of the different categories of dynamic gestures;

an image sequence forming subunit 6073, configured to capture image blocks corresponding to annotation information of the dynamic gesture boxes from multiple image frames of the sample video stream to form an image sequence; and a training subunit 6074, configured to train the first dynamic gesture recognition model by using categories of the dynamic gestures as supervision data and using the image sequence as training data.

In an optional manner, the training subunit 6074 is configured to: divide the image sequence into at least one segment; extract a preset number of image frames from the at least one segment, and stack the image frames to form image training data; and train the first dynamic gesture recognition model by using categories of the dynamic gestures as supervision data and using the image training data.

In an optional manner, the gesture recognition unit 604 further includes: a second dynamic gesture recognition model establishment unit 608, where the second dynamic gesture recognition model establishment unit 608 includes:

a sample collection subunit 6081, configured to collect a sample video stream involving different categories of dynamic gestures;

a gesture box annotating subunit 6082, configured to annotate dynamic gesture boxes of the different categories of dynamic gestures;

an image sequence forming subunit 6083, configured to capture image blocks corresponding to annotation information of the dynamic gesture boxes from multiple image frames of the sample video stream to form an image sequence; and an image difference determination subunit 6084, configured to determine multiple inter-frame image differences in the image sequence;

an image difference sequence determination subunit 6085, configured to generate an image difference sequence based on the multiple determined inter-frame image differences; and a training subunit 6086, configured to train the second dynamic gesture recognition model by using categories of the dynamic gestures as supervision data and using the image difference sequence as training data.

In an optional manner, the training subunit 6086 is configured to: divide the image difference sequence into at least one segment; extract a preset number of image frames from the at least one segment, and stack the image frames to form image difference training data; and train the second dynamic gesture recognition model by using the categories of the dynamic gestures as supervision data and using the image difference training data.

The apparatus for recognizing a dynamic gesture of this embodiment may be configured to implement the corresponding method for recognizing a dynamic gesture in the multiple forgoing method embodiments, and has the beneficial effects of the corresponding method embodiments. Details are not described below again.

Figure 7:
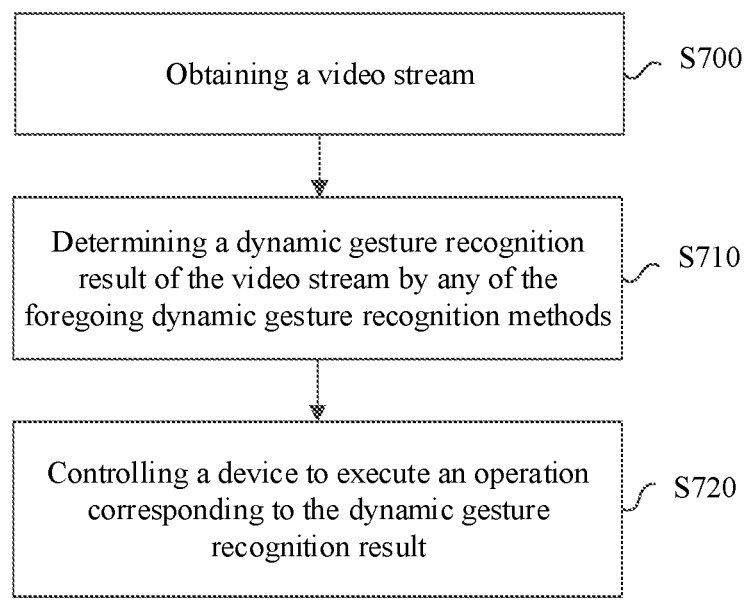
FIG. 7 is a flowchart of a control method using gesture interaction according to an embodiment of the present disclosure.

FIG. 7 is a flowchart of a control method using gesture interaction according to an embodiment of the present disclosure. The method may be performed by any electronic device, such as a terminal device, a server, a mobile device, a vehicle-mounted device, an unmanned aerial vehicle, a robot, an unmanned vehicle, a television, a vehicle, a household device, or other categories of smart devices. As shown in FIG. 7, the control method using gesture interaction includes:

step S700, a video stream is obtained.

In an optional example, step S700 may be performed by a processor by invoking a corresponding instruction stored in a memory, or may be performed by a video stream obtaining module 100 run by the processor.

Step S710, a dynamic gesture recognition result of the video stream is determined by the any of the foregoing methods for recognizing a dynamic gesture.

In an optional example, step S710 may be performed by a processor by invoking a corresponding instruction stored in a memory, or may be performed by a result obtaining module 200 run by the processor.

Step S720, a device is controlled to execute an operation corresponding to the dynamic gesture recognition result.

In an optional example, step S720 may be performed by a processor by invoking a corresponding instruction stored in a memory, or may be performed by an operation execution module 300 run by the processor.

In an optional implementation, a photographing apparatus may be provided on a device that needs a control operation, and a video stream may be acquired in real time by the photographing apparatus. It is also possible to obtain a video stream that has been captured by the photographing apparatus. Video streams may be captured by different photographing apparatuses. The photographing apparatus may include a binocular camera, a depth camera, or a normal camera. Different categories of cameras may be used for capturing video streams according to the needs of dynamic gesture recognition.

In an optional implementation, step S720 includes:

obtaining an operation instruction corresponding to the dynamic gesture recognition result according to a predetermined correspondence between the dynamic gesture recognition result and the operation instruction; and controlling the device to execute a corresponding operation according to the operation instruction.

In an optional implementation, the correspondence between the dynamic gesture recognition result and the operation instruction may be preset. In the correspondence, one dynamic gesture recognition result may correspond to one operation instruction, or multiple dynamic gesture recognition results may correspond to one operation instruction. The category and content of the operation instruction may be determined according to the category of the device to be operated and operation requirements. The embodiments of the present disclosure do not limit the form and specific content of the operation instruction.

In an optional implementation, the operation instruction may be output to control the device to be operated. Since the action in the video stream may be tracked in real time by the dynamic gesture recognition result, the action of the execution object in the video stream may also be tracked in real time by the output operation instruction, so that the operator can control the operated device relatively accurately.

In the embodiments of the present disclosure, the operation instruction corresponding to the dynamic gesture recognition result may be determined according to the correspondence and the dynamic gesture recognition result and then output. Based on the real-time and accuracy of the dynamic gesture recognition result, the action of the execution object in the video stream may also be tracked in real time by the operation instruction, so that the operator can operate the device more accurately.

In an optional implementation, the controlling the device to execute a corresponding operation according to the operation instruction includes:

controlling a window, a door, or a vehicle-mounted system of a vehicle according to the operation instruction.

In an optional implementation, a monitoring device may be provided in the vehicle to take a surveillance video of the driver or a passenger in the vehicle as a video stream. Real-time dynamic gesture recognition may be performed on the captured video stream.

In an optional implementation, the controlling a device to execute an operation corresponding to the dynamic gesture recognition result includes:

in response to the dynamic gesture recognition result being a predefined dynamic action, controlling a vehicle to execute an operation corresponding to the predefined dynamic action.

In an optional implementation, the predefined dynamic action includes a dynamic gesture, and the dynamic gesture may include, but is not limited to, at least one of: single-finger clockwise/counterclockwise rotation, palm left/right swing, two-finger poke, extending the thumb and pinky finger, press-down with the palm downward, lift with the palm upward, fanning to the left/right with the palm, left/right movement with the thumb extended, long slide to the left/right with the palm, changing a fist into a palm with the palm upward, changing a palm into a fist with the palm upward, changing a palm into a fist with the palm downward, changing a fist into a palm with the palm downward, single-finger slide, pinch-in with multiple fingers, single-finger double click, single-finger single click, multi-finger double click, and multi-finger single click; and the operation corresponding to the predefined dynamic action may include, but is not limited to, at least one of: volume up/down, song switching, song pause/resume, call answering or initiation, hang-up or call rejection, air conditioning temperature increase or decrease, multi-screen interaction, sunroof opening, sunroof closing, door lock locking, door lock unlocking, drag for navigation, map zoom-out, and map zoom-in.

In an optional implementation, the dynamic gesture of single-finger clockwise/counterclockwise rotation may be used for adjusting the volume of an audio device in the vehicle up/down. The dynamic gesture of palm left/right swing may be used for song switching on the audio device in the vehicle. The dynamic gesture of two-finger poke may be used for song pause/resume on the audio device in the vehicle. The dynamic gesture of extending the thumb and pinky finger may be used for call answering or initiation on a communication device in the vehicle. The dynamic gesture of press-down with the palm downward may be used for hang-up or call rejection on the communication device in the vehicle. The dynamic gesture of left/right movement with the thumb extended may be used for increasing or decreasing the air conditioning temperature of the air conditioning device in the vehicle. The dynamic gesture of long slide to the left/right with the palm may be used for performing a multi-screen interaction operation on the display screen in the vehicle. The dynamic gesture of changing a fist into a palm with the palm upward may be used for opening the sunroof of the vehicle (such as opening the sunroof by a set length each time, for example, opening the sunroof by 10 centimeters each time). The dynamic gesture of changing a palm into a fist with the palm upward may be used for closing the sunroof of the vehicle. The dynamic gesture of changing a palm into a fist with the palm downward may be used for locking the door lock of the vehicle. The dynamic gesture of changing a fist into a palm with the palm downward may be used for unlocking the door lock of the vehicle. The dynamic gesture of single-finger slide may be used for performing a drag for navigation operation on the navigation device of the vehicle. The dynamic gesture of pinch-in with multiple fingers may be used for zooming out the map on the navigation device of the vehicle. The dynamic gesture of single-finger double click may be used for zooming in the map on the navigation device of the vehicle.

In the embodiments of the present disclosure, a window, a door, or a vehicle-mounted system of the vehicle may be controlled by the operation instruction. Different operations may be performed on the vehicle itself or on a vehicle-mounted system of the vehicle by means of dynamic actions recognized from the video stream. Based on the dynamic action detection methods in the embodiments of the present disclosure, the operator can control the vehicle itself or the vehicle-mounted system relatively accurately.

Figure 8:
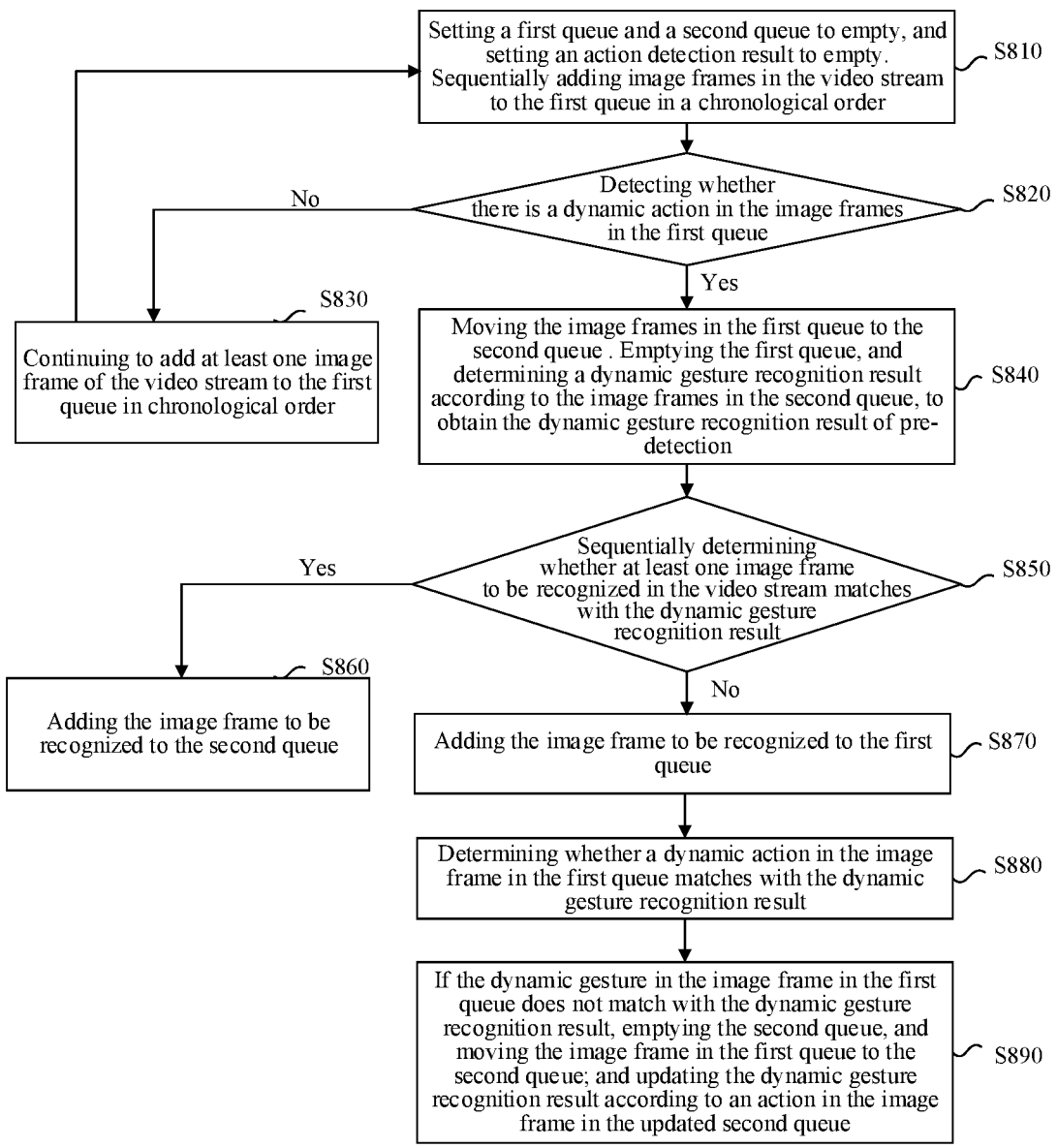
FIG. 8 is a flowchart of an application example of a control method using gesture interaction according to an embodiment of the present disclosure.

FIG. 8 is a flowchart of an application example of a control method using gesture interaction according to an embodiment of the present disclosure. As shown in FIG. 8:

a depth camera may be provided in the vehicle, and the driver's surveillance image is acquired by the depth camera as a video stream. Real-time action recognition may be performed on the captured surveillance image. In the embodiments of the present disclosure, dynamic gesture recognition is performed on the driver's hand action.

I. Obtaining of a Dynamic Gesture Recognition Result of Pre-Detection:

step S810, a first queue and a second queue are set to empty, and a dynamic gesture recognition result is also set to empty. Image frames in the video stream are sequentially added to the first queue in a chronological order.

Step S820, whether there is a dynamic action in the image frames in the first queue is detected. If not, the process proceeds to step S830, and if yes, the process proceeds to step S840.

In an optional implementation, the length of the first queue may be ten image frames. After the first to tenth image frames in the video stream are added to the first queue, whether there is a dynamic gesture in the ten image frames in the first queue may be determined. For example, the dynamic action is a hand dynamic action. Optionally, whether there is a hand in the image frames may be recognized in sequence, and if there is a hand in the image frames in the first queue, a gesture in the image to be recognized may be recognized according to the finger and/or the palm of the hand. If a gesture in at least one image frame is matched, motion trajectory and/or switching information of the gesture in the at least one image frame may be determined. If the motion trajectory and/or switching information of the gesture in the at least one image frame is also matched, a dynamic action in the first queue may be detected.

Step S830, at least one image frame of the video stream continues to be added to the first queue in a chronological order, and the process jumps to step S820.

In an optional implementation, the eleventh image frame may be added to the rear end of the first queue, and the first image frame on the front end of the first queue is removed from the first queue. In this case, the first queue includes the second to eleventh image frames, and whether there is a dynamic action in the first queue may be determined after the process jumps to step S820. If there is no dynamic action, the twelfth image frame may continue to be added to the first queue, and the second image frame is removed, until it is determined according to step S820 that there is a dynamic action in the image frames in the first queue.

Step S840, the image frames in the first queue is moved to the second queue. The first queue is emptied, and a dynamic gesture recognition result is determined according to the image frames in the second queue, to obtain the dynamic gesture recognition result of pre-detection.

In an optional implementation, after the dynamic gesture recognition result of pre-detection is obtained, the first queue is empty, and the second queue includes ten image frames, which are the twenty-third to thirty-second image frames in the video stream. A dynamic gesture recognition result may be determined according to an action in the image frames in the second queue. Image frames on which no dynamic gesture recognition is performed in the video stream may be used as image frames to be recognized for subsequent analysis. That is, the image frames starting from the thirty-third image frame may be used as image frames to be recognized, and subjected to step S850 of subsequent dynamic action detection.

II. Dynamic Gesture Recognition Steps:

step S850, whether at least one image frame to be recognized in the video stream matches with the dynamic gesture recognition result is sequentially determined. If yes, the process proceeds to step S860, and if not, the process proceeds to step S870.

In an optional implementation, whether the thirty-third image frame matches with the dynamic gesture recognition result may be determined according to the thirty-third image frame and the rearmost image frame in the second queue (the thirty-second image frame). Whether a gesture in the thirty-third image frame is consistent with the gesture in the thirty-second image frame in the second queue may be first determined. If yes, whether the motion trajectory and/or switching information of the gesture in the thirty-third image frame matches with the motion trajectory and/or switching information of the gesture in the dynamic gesture recognition result is determined (matching the dynamic trajectory of the gesture in the image frame with the dynamic trajectory of the gesture in the dynamic gesture recognition result, and matching the switching information of the gesture in the image frame with the switching information of the gesture in the dynamic gesture recognition result). If the motion trajectory and/or switching information of the gesture is also matched, it may be determined that the thirty-third image frame matches with the dynamic gesture recognition result.

Step S860, if yes, the image frame to be recognized is added to the second queue.

In an optional implementation, after the thirty-third image frame is added to the second queue, the image frames in the second queue are updated to the twenty-fourth to thirty-third frames.

Step S870, if not, the image frame to be recognized is added to the first queue.

Step S880, whether a dynamic gesture in the image frame in the first queue matches with the dynamic gesture recognition result is determined. If not, the process proceeds to step S890.

Step S890, if the dynamic gesture in the image frame in the first queue does not match with the dynamic gesture recognition result, the second queue is emptied, and the image frame in the first queue is moved to the second queue. The dynamic gesture recognition result is updated according to an action in the image frame in the updated second queue.

It should be understood that the foregoing various method embodiments mentioned in the embodiments of the present disclosure may be combined with each other to form a combined embodiment without departing from the principle logic. Details are not described herein again due to space limitation.

A person of ordinary skill in the art may understand that all or some steps for implementing the foregoing method embodiments may be achieved by a program by instructing related hardware; the foregoing program can be stored in a computer-readable storage medium; when the program is executed, steps including the foregoing method embodiments are executed. Moreover, the foregoing storage medium includes various media capable of storing program codes, such as ROM, RAM, a magnetic disk, or an optical disk.

Figure 9:
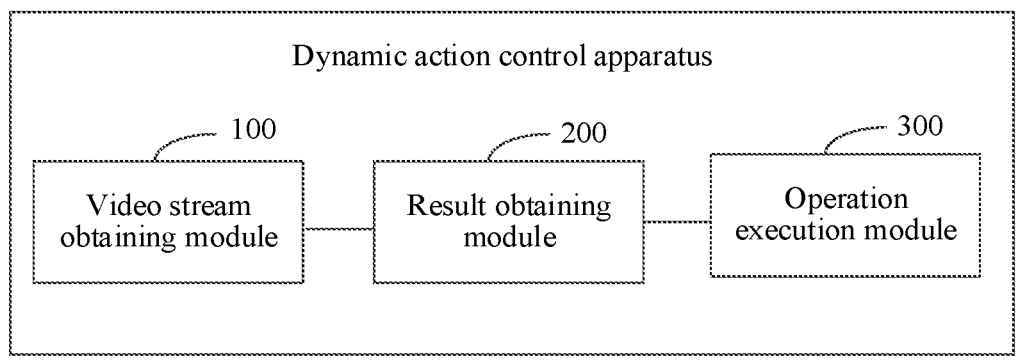
FIG. 9 is a schematic structural diagram of a control apparatus using gesture interaction according to an embodiment of the present disclosure.

FIG. 9 is a schematic structural diagram of a control apparatus using gesture interaction according to an embodiment of the present disclosure. As shown in FIG. 9, the control apparatus using gesture interaction includes:

a video stream obtaining module 100, configured to obtain a video stream;

a result obtaining module 200, configured to determine a dynamic gesture recognition result of the video stream by the apparatus for recognizing a dynamic gesture above; and an operation execution module 300, configured to control a device to execute an operation corresponding to the dynamic gesture recognition result.

In an optional implementation, the operation execution module 300 includes:

an operation instruction obtaining sub-module, configured to obtain an operation instruction corresponding to the dynamic gesture recognition result according to a predetermined correspondence between the dynamic gesture recognition result and the operation instruction; and an operation execution sub-module, configured to control the device to execute a corresponding operation according to the operation instruction.

In an optional implementation, the operation execution sub-module is configured to:

control a window, a door, or a vehicle-mounted system of a vehicle according to the operation instruction.

In an optional implementation, the operation execution module 300 is further configured to:

in response to the dynamic gesture recognition result being a predefined dynamic action, control the vehicle to execute an operation corresponding to the predefined dynamic action.

In an optional implementation, the predefined dynamic action includes a dynamic gesture, and the dynamic gesture may include, but is not limited to, at least one of: single-finger clockwise/counterclockwise rotation, palm left/right swing, two-finger poke, extending the thumb and pinky finger, press-down with the palm downward, lift with the palm upward, fanning to the left/right with the palm, left/right movement with the thumb extended, long slide to the left/right with the palm, changing a fist into a palm with the palm upward, changing a palm into a fist with the palm upward, changing a palm into a fist with the palm downward, changing a fist into a palm with the palm downward, single-finger slide, pinch-in with multiple fingers, single-finger double click, single-finger single click, multi-finger double click, and multi-finger single click; and the operation corresponding to the predefined dynamic action may include, but is not limited to, at least one of: volume up/down, song switching, song pause/resume, call answering or initiation, hang-up or call rejection, air conditioning temperature increase or decrease, multi-screen interaction, sunroof opening, sunroof closing, door lock locking, door lock unlocking, drag for navigation, map zoom-out, and map zoom-in.

A person skilled in the art can understand that, in the foregoing methods of the specific implementations, the order in which the steps are written does not imply a strict execution order which constitutes any limitation to the implementation process, and the specific order of executing the steps should be determined by functions and possible internal logics thereof.

In some embodiments, the functions provided by or the modules included in the apparatuses provided by the embodiments of the present disclosure may be used to implement the methods described in the foregoing method embodiments. For specific implementations, reference may be made to the description in the method embodiments above. For the purpose of brevity, details are not described herein again.

According to still another aspect of the embodiments of the present disclosure, an electronic device is provided, including a processor, where the processor includes the apparatus for recognizing a dynamic gesture according to any of the foregoing embodiments of the present disclosure, or the dynamic gesture recognition model establishment apparatus according to any of the foregoing embodiments of the present disclosure, or the control apparatus using gesture interaction according to any of the foregoing embodiments of the present disclosure.

According to still another aspect of the embodiments of the present disclosure, an electronic device is provided, including: a memory, configured to store executable instructions; and a processor, configured to communicate with the memory to execute the executable instructions to complete operations of the method for recognizing a dynamic gesture according to any of the foregoing embodiments of the present disclosure, or the dynamic gesture recognition model establishment method according to any of the foregoing embodiments of the present disclosure, or the control method using gesture interaction according to any of the foregoing embodiments of the present disclosure.

According to still another aspect of the embodiments of the present disclosure, a computer-readable storage medium is provided, configured to store computer-readable instructions, where when the instructions are executed, operations of the method for recognizing a dynamic gesture according to any of the foregoing embodiments of the present disclosure, or the dynamic gesture recognition model establishment method according to any of the foregoing embodiments of the present disclosure, or the control method using gesture interaction according to any of the foregoing embodiments of the present disclosure are executed.

According to yet another aspect of the embodiments of the present disclosure, a computer program product is provided, including a computer-readable code, where when the computer-readable code is run on a device, a processor in the device executes instructions for implementing the method for recognizing a dynamic gesture according to any of the foregoing embodiments of the present disclosure, or the dynamic gesture recognition model establishment method according to any of the foregoing embodiments of the present disclosure, or the control method using gesture interaction according to any of the foregoing embodiments of the present disclosure.

Figure 10:
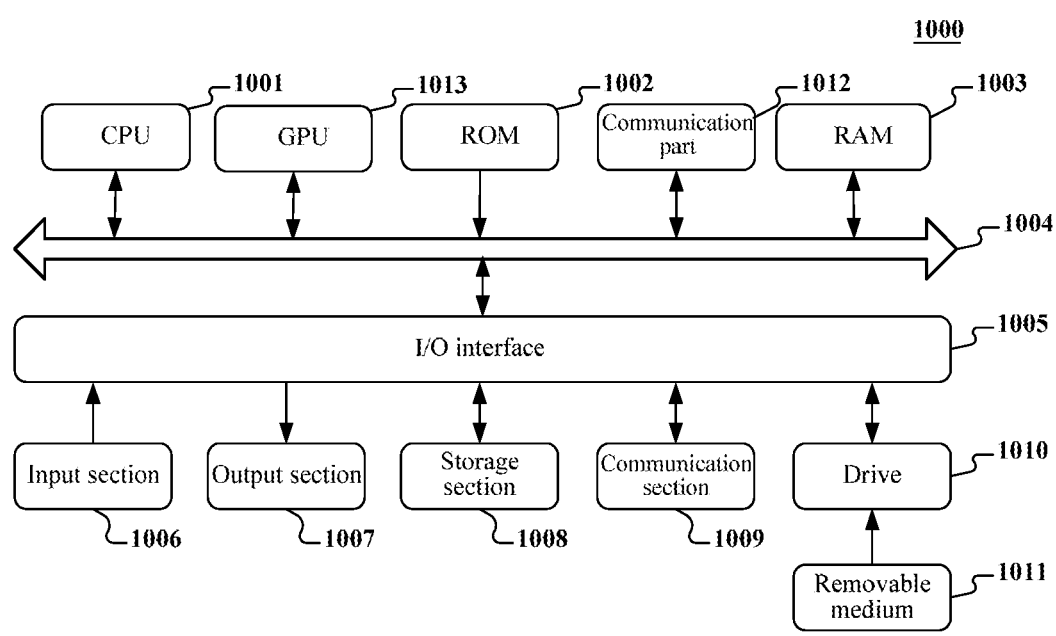
FIG. 10 is a schematic structural diagram of an electronic device according to an embodiment of the present disclosure.

The embodiments of the present disclosure further provide an electronic device which, for example, may be a mobile terminal, a PC, a tablet computer, a server, and the like Referring to FIG. 10 below, a schematic structural diagram of an electronic device 1000, which may be a terminal device or a server, suitable for implementing an embodiment of the present disclosure is shown. As shown in FIG. 10, the computer system 1000 includes one or more processors, a communication part, and the like. The one or more processors are, for example, one or more Central Processing Units (CPUs) 1001 and/or one or more Graphic Processing Units (GPUs) 1013, and the processor may execute appropriate actions and processing according to executable instructions stored in a ROM 1002 or executable instructions loaded from a storage section 1008 to a RAM 1003. The communication part 1012 may include, but is not limited to, a network card. The network card may include, but is not limited to, an Infiniband (IB) network card.

The processor may communicate with the ROM 602 and/or the RAM 1030 to execute executable instructions, is connected to the communication part 1012 by means of a bus 1004, and communicates with other target devices by means of the communication part 1012, so as to complete corresponding operations of any of the methods provided by the embodiments of the present disclosure, for example, positioning a dynamic gesture in a video stream to be detected to obtain a dynamic gesture box; capturing an image block corresponding to the dynamic gesture box from multiple image frames of the video stream; generating a detection sequence based on the captured image block; and performing dynamic gesture recognition according to the detection sequence.

In addition, the RAM 1003 may further store various programs and data required for operations of an apparatus. The CPU 1001, the ROM 1002, and the RAM 1003 are connected to each other via the bus 1004. In the presence of the RAM 1003, the ROM 1002 is an optional module. The RAM 1003 stores executable instructions, or writes the executable instructions into the ROM 1002 during running, where the executable instructions cause the processor 1001 to execute corresponding operations of the foregoing communication method. An Input/Output (I/O) interface 1005 is also connected to the bus 1004. The communication part 1012 is integrated, or is configured to have multiple sub-modules (for example, multiple IB network cards) connected to the bus.

The following components are connected to the I/O interface 1005: an input section 1006 including a keyboard, a mouse and the like; an output section 1007 including a Cathode-Ray Tube (CRT), a Liquid Crystal Display (LCD), a speaker and the like; the storage section 1008 including a hard disk drive and the like; and a communication section 1009 of a network interface card including an LAN card, a modem and the like. The communication section 1009 performs communication processing via a network such as the Internet. A drive 1010 is also connected to the I/O interface 1005 according to requirements. A removable medium 1011 such as a magnetic disk, an optical disk, a magneto-optical disk, a semiconductor memory or the like is mounted on the drive 1010 according to requirements, so that a computer program read from the removable medium is installed on the storage section 1008 according to requirements.

It should be noted that the architecture shown in FIG. 10 is merely an optional implementation. During specific practice, the number and categories of the components in FIG. 10 is selected, decreased, increased, or replaced according to actual requirements. Different functional components are separated or integrated or the like. For example, the GPU and the CPU are separated, or the GPU is integrated on the CPU, and the communication part is separated from or integrated on the CPU or the GPU or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product. The computer program product includes a computer program tangibly included in a machine-readable medium. The computer program includes a program code for executing a method shown in the flowchart. The program code may include corresponding instructions for correspondingly executing steps of the method provided by the embodiments of the present disclosure, for example, positioning a dynamic gesture in a video stream to be detected to obtain a dynamic gesture box; capturing a preset number of image frames from the dynamic gesture box, and calculating the image difference between two adjacent image frames from the captured images; and performing dynamic gesture recognition according to the captured images and the image difference between the two adjacent image frames. In such embodiments, the computer program is downloaded and installed from the network through the communication section 1009, and/or is installed from the removable medium 1011. The computer program, when being executed by the CPU 1001, executes the foregoing functions defined in the methods of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for recognizing a dynamic gesture, comprising:
    positioning a dynamic gesture in a video stream to be detected to obtain a dynamic gesture box;
    capturing an image block corresponding to the dynamic gesture box from each of multiple image frames of the video stream, wherein respective parts of the multiple image frames, which are out of the dynamic gesture box, are removed;
    generating a detection sequence based on the captured image blocks, wherein the detection sequence is a sequence of images different from the multiple image frames of the video stream; and
    performing dynamic gesture recognition according to the detection sequence,
    wherein the performing dynamic gesture recognition according to the detection sequence comprises:
    determining multiple inter-frame image differences in the detection sequence, wherein each of the multiple inter-frame image differences is an image obtained by calculating a difference between pixels at each same position in two adjacent or non-adjacent image frames;
    generating an image difference sequence based on the multiple inter-frame image differences; and
    performing the dynamic gesture recognition according to the detection sequence and the image difference sequence, which comprises:
        inputting the detection sequence into a first dynamic gesture recognition model to obtain a first dynamic gesture category prediction probability output by the first dynamic gesture recognition model;
        inputting the image difference sequence into a second dynamic gesture recognition model to obtain a second dynamic gesture category prediction probability output by the second dynamic gesture recognition model; and
        determining a dynamic gesture recognition result according to the first dynamic gesture category prediction probability and the second dynamic gesture category prediction probability.

2. A control method using gesture interaction, comprising:
    obtaining a video stream;
    determining a dynamic gesture recognition result of the video stream by the method according to claim 1; and
    controlling a device to execute an operation corresponding to the dynamic gesture recognition result.

3. The method according to claim 2, wherein the controlling a device to execute an operation corresponding to the dynamic gesture recognition result comprises:
    obtaining the operation instruction corresponding to the dynamic gesture recognition result according to a predetermined correspondence between the dynamic gesture recognition result and the operation instruction; and controlling the device to execute a corresponding operation according to the operation instruction; or
wherein the controlling a device to execute an operation corresponding to the dynamic gesture recognition result comprises:
in response to the dynamic gesture recognition result being a predefined dynamic action, controlling a vehicle to execute an operation corresponding to the predefined dynamic action.

4. The method according to claim 3, wherein the controlling the device to execute a corresponding operation according to the operation instruction comprises:
controlling a window, a door, or a vehicle-mounted system of a vehicle according to the operation instruction.

5. The method according to claim 3, wherein the predefined dynamic action comprises a dynamic gesture comprising at least one of:
single-finger clockwise/counterclockwise rotation, palm left/right swing, two-finger poke, extending the thumb and pinky finger, press-down with the palm downward, lift with the palm upward, fanning to the left/right with the palm, left/right movement with the thumb extended, long slide to the left/right with the palm, changing a fist into a palm with the palm upward, changing a palm into a fist with the palm upward, changing a palm into a fist with the palm downward, changing a fist into a palm with the palm downward, single-finger slide, pinch-in with multiple fingers, single-finger double click, single-finger single click, multi-finger double click, or multi-finger single click; and
the operation corresponding to the predefined dynamic action comprises at least one of: volume up/down, song switching, song pause/resume, call answering or initiation, hang-up or call rejection, air conditioning temperature increase or decrease, multi-screen interaction, sunroof opening, sunroof closing, door lock locking, door lock unlocking, drag for navigation, map zoom-out, or map zoom-in.

6. An electronic device, comprising:
a memory storing processor-executable instructions; and
a processor, configured to execute the stored processor-executable instructions to perform operations of the control method using gesture interaction according to claim 3.

7. The method according to claim 1, wherein the positioning a dynamic gesture in a video stream to be detected to obtain a dynamic gesture box comprises:
positioning a static gesture in at least one image frame of the multiple image frames of the video stream to obtain a static gesture box of the at least one image frame; and
determining the dynamic gesture box according to the static gesture box of the at least one image frame.

8. The method according to claim 7, wherein the determining the dynamic gesture box according to the static gesture box of the at least one image frame comprises:
enlarging the static gesture box of the at least one image frame to obtain the dynamic gesture box.

9. The method according to claim 7, wherein the static gesture box of the at least one image frame of the multiple image frames of the video stream meets the following condition:
the static gesture box is located within the dynamic gesture box, or the static gesture box is as same as the dynamic gesture box.

10. The method according to claim 1, wherein before the performing the dynamic gesture recognition according to the detection sequence and the image difference sequence, the method further comprises: establishing the first dynamic gesture recognition model by:
collecting one or more sample video streams involving different categories of dynamic gestures;
annotating dynamic gesture boxes of the different categories of dynamic gestures;
capturing image blocks corresponding to annotation information of the dynamic gesture boxes from multiple image frames of the sample video stream to form an image sequence; and
training the first dynamic gesture recognition model by using categories of the dynamic gestures as supervision data and using the image sequence as training data.

11. The method according to claim 10, wherein the training the first dynamic gesture recognition model by using categories of the dynamic gestures as supervision data and using the image sequence as training data comprises:
dividing the image sequence into at least one segment;
extracting a preset number of image frames from the at least one segment, and stacking the image frames to form image training data; and
training the first dynamic gesture recognition model by using the categories of the dynamic gestures as the supervision data and using the image training data.

12. The method according to claim 1, wherein before the performing dynamic gesture recognition according to the detection sequence and the image difference sequence, the method further comprises: establishing the second dynamic gesture recognition model by the following means:
collecting one or more sample video streams involving different categories of dynamic gestures;
annotating dynamic gesture boxes of the different categories of dynamic gestures;
capturing image blocks corresponding to annotation information of the dynamic gesture boxes from multiple image frames of the one or more sample video streams to form the image sequence;
determining multiple inter-frame image differences in the image sequence;
generating an image difference sequence based on the multiple inter-frame image differences; and
training the second dynamic gesture recognition model by using categories of the dynamic gestures as supervision data and using the image difference sequence as training data.

13. The method according to claim 12, wherein the training the second dynamic gesture recognition model by using categories of the dynamic gestures as supervision data and using the image difference sequence as training data comprises:
dividing the image difference sequence into at least one segment;
extracting a preset number of image frames from the at least one segment, and stacking the image frames to form image difference training data; and
training the second dynamic gesture recognition model by using the categories of the dynamic gestures as the supervision data and using the image difference training data.

14. The method according to claim 1, wherein one of the multiple inter-frame image differences is an image difference between two adjacent reference frames in the detection sequence.

15. The method according to claim 1, wherein the first dynamic gesture recognition model is a first neural network, the second dynamic gesture recognition model is a second neural network, and the first neural network and the second neural network have a same structure or different structures.

16. The method according to claim 1, further comprising:
performing the capturing a plurality of times to obtain the detection sequence, generating the image difference sequence a plurality of times, and performing the dynamic gesture recognition a plurality of times according to the detection sequence and the image difference sequence; and
determining the dynamic gesture recognition result according to a probability of a dynamic gesture category, the probability being obtained by dynamic gesture recognition each time.

17. An electronic device, comprising:
memory storing processor-executable instructions; and
a processor, configured to execute the stored processor-executable instructions to perform operations of:
positioning a dynamic gesture in a video stream to be detected to obtain a dynamic gesture box;
capturing an image block corresponding to the dynamic gesture box from each of multiple image frames of the video stream, wherein respective parts of the multiple image frames, which are out of the dynamic gesture box, are removed;
generating a detection sequence based on the captured image blocks, wherein the detection sequence is a sequence of images different from the multiple image frames of the video stream; and
performing dynamic gesture recognition according to the detection sequence,
wherein the performing dynamic gesture recognition according to the detection sequence comprises:
determining multiple inter-frame image differences in the detection sequence, wherein each of the multiple inter-frame image differences is an image obtained by calculating a difference between pixels at each same position in two adjacent or non-adjacent image frames;
generating an image difference sequence based on the multiple inter-frame image differences; and
performing the dynamic gesture recognition according to the detection sequence and the image difference sequence, which comprises:
inputting the detection sequence into a first dynamic gesture recognition model to obtain a first dynamic gesture category prediction probability output by the first dynamic gesture recognition model;
inputting the image difference sequence into a second dynamic gesture recognition model to obtain a second dynamic gesture category prediction probability output by the second dynamic gesture recognition model; and
determining a dynamic gesture recognition result according to the first dynamic gesture category prediction probability and the second dynamic gesture category prediction probability.

18. A non-transitory computer-readable storage medium having stored thereon computer-readable instructions that, when executed by a processor, cause the processor to perform operations of a method for recognizing a dynamic gesture, the method comprising:
positioning a dynamic gesture in a video stream to be detected to obtain a dynamic gesture box;
capturing an image block corresponding to the dynamic gesture box from each of multiple image frames of the video stream, wherein respective parts of the multiple image frames, which are out of the dynamic gesture box, are removed;
generating a detection sequence based on the captured image blocks, wherein the detection sequence is a sequence of images different from the multiple image frames of the video stream; and
performing dynamic gesture recognition according to the detection sequence,
wherein the performing dynamic gesture recognition according to the detection sequence comprises:
determining multiple inter-frame image differences in the detection sequence, wherein each of the multiple inter-frame image differences is an image obtained by calculating a difference between pixels at each same position in two adjacent or non-adjacent image frames;
generating an image difference sequence based on the multiple inter-frame image differences; and
performing the dynamic gesture recognition according to the detection sequence and the image difference sequence, which comprises:
inputting the detection sequence into a first dynamic gesture recognition model to obtain a first dynamic gesture category prediction probability output by the first dynamic gesture recognition model;
inputting the image difference sequence into a second dynamic gesture recognition model to obtain a second dynamic gesture category prediction probability output by the second dynamic gesture recognition model; and
determining a dynamic gesture recognition result according to the first dynamic gesture category prediction probability and the second dynamic gesture category prediction probability.

* * * * *